United States Patent
Itzhaky

(10) Patent No.: US 6,705,347 B2
(45) Date of Patent: Mar. 16, 2004

(54) PIEZOELECTRIC BASED VALVE

(76) Inventor: Itzhak M. Itzhaky, 238 Central Park Rd., Plainview, NY (US) 11308

( * ) Notice: Subject to any disclaimer, the term of this patent is extended or adjusted under 35 U.S.C. 154(b) by 105 days.

(21) Appl. No.: 10/154,885

(22) Filed: May 23, 2002

(65) Prior Publication Data

US 2003/0178074 A1 Sep. 25, 2003

Related U.S. Application Data

(63) Continuation-in-part of application No. 10/104,640, filed on Mar. 22, 2002, now abandoned.

(51) Int. Cl.[7] ............................................... F15B 13/044
(52) U.S. Cl. ............................ 137/625.65; 137/625.44; 251/129.06
(58) Field of Search ....................... 137/625.44, 625.65; 251/129.06

(56) References Cited

U.S. PATENT DOCUMENTS 5,343,894 A    9/1994   Frisch et al.
5,779,218 A    7/1998   Kowanz
6,164,621 A  * 12/2000  Bouchard et al. ...... 251/129.06

* cited by examiner

*Primary Examiner*—Gerald A. Michalsky

(57) ABSTRACT

A piezoelectric valve is characterized by a unique mounting arrangement for the piezoelectric element in the valve housing. The element is elongated and has one end arranged between pressurized inlet and exhaust outlet openings in the housing. The other end of the element is encapsulated in a support member which is arranged in a recess in the housing. A second support member is connected with the piezoelectric element intermediate the ends thereof. The second support is rotatably connected with the housing. When the piezoelectric element is in an active condition, the element bends to apply a strong closing force of the first end portion against the exhaust outlet so that all of the pressure from the inlet is delivered to a working outlet of the housing. When the piezoelectric element is in an inactive condition, the first end portion closes the pressurized inlet.

8 Claims, 2 Drawing Sheets

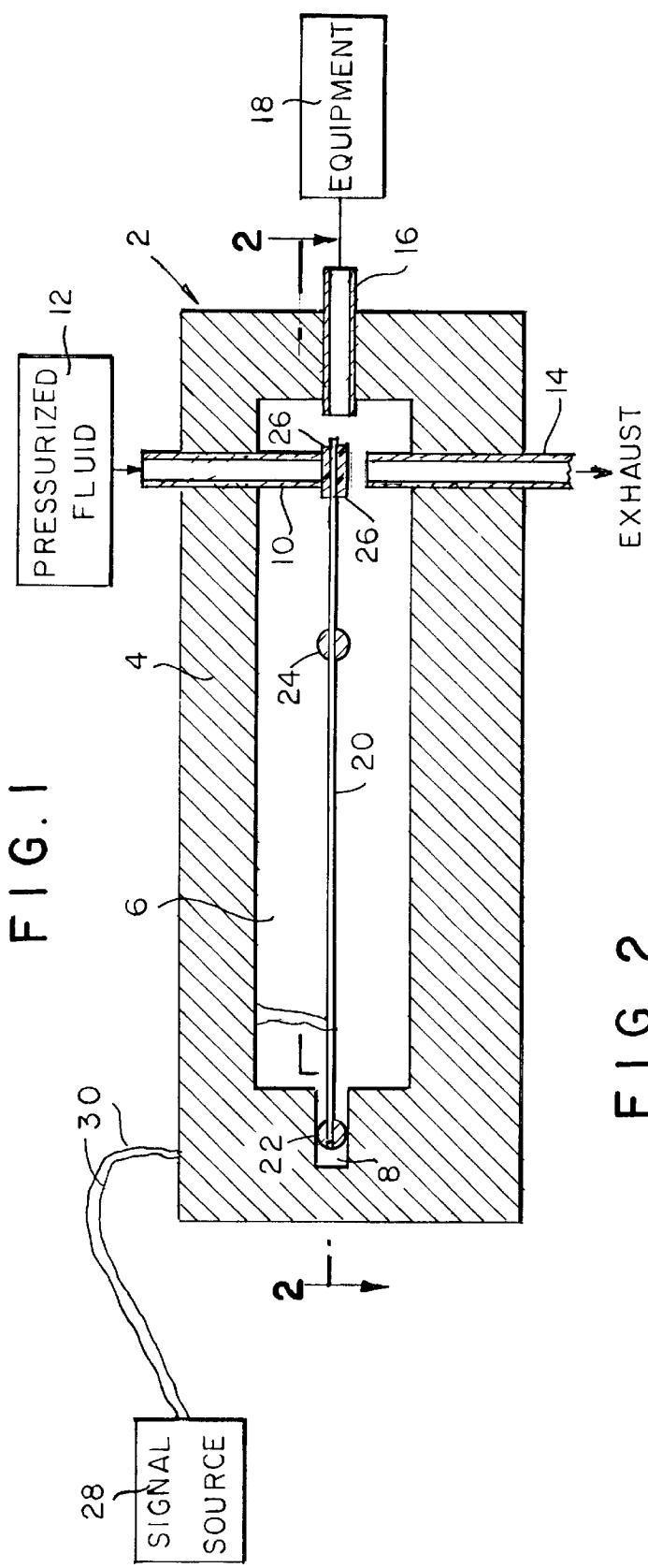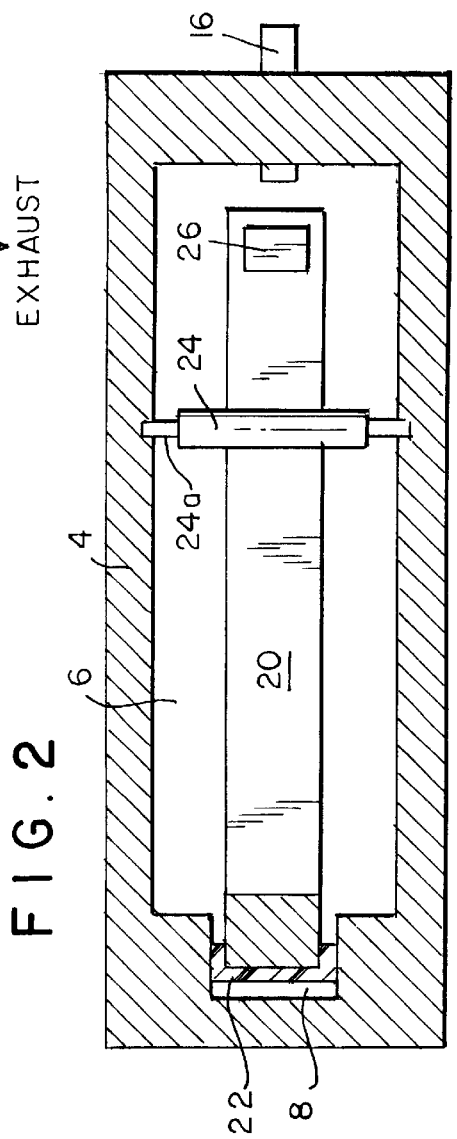

PIEZOELECTRIC BASED VALVE

This application is a continuation-in-part of U.S. application Ser. No. 10/104,640 filed Mar. 22, 2002 now abandoned.

BACKGROUND OF THE INVENTION

Various pieces of equipment are operated by hydraulic or pneumatic pressure delivered to the equipment via a valve. The present invention relates to a piezoelectric based valve which is constructed to provide a tight seal against an exhaust opening of the valve so that the maximum pressure of a pressurized fluid is delivered to the equipment, thereby maximizing the efficiency thereof.

BRIEF DESCRIPTION OF THE PRIOR ART

Valves including piezoelectric elements are well known in the patented prior art as evidenced by the Kowanz U.S. Pat. No. 5,779,218 and Frisch et al. U.S. Pat. No. 5,343,894. In the known devices, an end of the piezoelectric element moves between open and closed positions. Since most piezo devices are thin, elongated elements, the closing force at a remote end of the devices is limited, whereby leakage of fluid pressure occurs.

The present invention was developed in order to overcome this and other drawbacks of prior piezo-based valves by providing a unique mounting arrangement for the piezoelectric element which significantly increases the sealing force applied by the movable end of the element.

SUMMARY OF THE INVENTION

Accordingly, it is a primary object of the invention to provide a valve including a housing containing a chamber, a recess at one end, and a pressurized fluid input, a working fluid outlet, and an exhaust outlet at the other end. An elongated piezoelectric element is arranged in the chamber and operable between inactive and active conditions to close the pressurized fluid inlet and exhaust outlet, respectively, with a first end portion thereof. The piezoelectric element is mounted in the chamber via two supports. A first support is connected with the other end of the element and is arranged in the housing recess for rotational and longitudinal movement therein as the piezoelectric element shifts between active and inactive conditions. A second support is connected with the piezoelectric element toward the first end portion thereof and is rotatably connected with the housing. When the element is activated by the application of an electrical signal, it bends. The second support rotates relative to the housing but prevents vertical displacement of that portion of the element. Thus, the bending force at the first end portion of the element is significantly greater to seal the exhaust outlet and deliver all of the pressurized fluid to the working outlet and then to a piece of equipment connected therewith. When the electrical signal is not applied, including in the event of a power failure, the element returns to the planar condition to close the pressurized fluid inlet.

According to a further object of the invention, sealing members are connected with opposite surfaces of the first end portion of the piezoelectric element to assist with closing the pressurized fluid inlet and exhaust outlet. The sealing members and the first and second supports are preferably formed of synthetic plastic material.

BRIEF DESCRIPTION OF THE FIGURES

Other objects and advantages of the invention will become apparent from a study of the following specification when viewed in the light of the accompanying drawing, in which:

FIG. 1 is a sectional view of the piezoelectric-based valve in an inoperative condition according to the invention;

FIG. 2 is a sectional view taken along line 2—2 of FIG. 1; and

DETAILED DESCRIPTION

Figure 3:
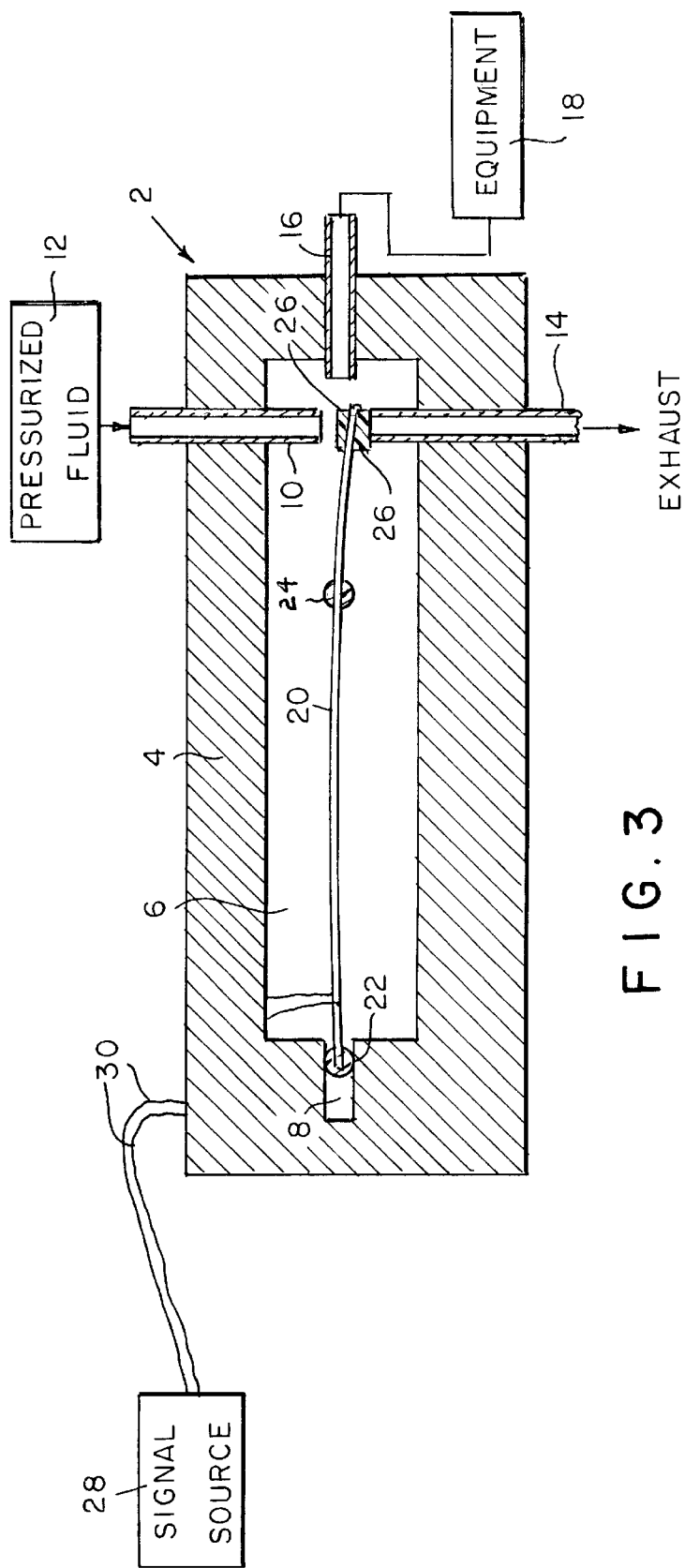
FIG. 3 is a sectional view of the valve of FIG. 1 in the operative condition.

Referring first to FIG. 1, there is shown a piezoelectric based valve 2 according to the invention. The valve includes a housing 4 which is shown having a rectangular configuration, although any configuration may be provided. The housing contains a chamber 6 and a recess 8 at one end thereof which communicates with the chamber. At the other end of the housing are three tubes which afford communication between the exterior of the housing and the chamber.

The first tube is a pressurized fluid inlet 10 which is connected with a pressurized fluid source 12. The fluid may comprise air in the case of a pneumatic valve or liquid such as oil in the case of a hydraulic valve. The second tube is an exhaust outlet 14. This tube is arranged opposite the pressurized fluid inlet 10. The third tube is a working outlet 16 which is connected with a piece of equipment 18 such as a user-operated power tool which is powered by pressurized fluid. The working outlet may be arranged at any location relative to the housing although the preferred location is between the pressurized fluid inlet 10 and the exhaust outlet 14 as shown in the drawing.

Arranged within the housing chamber is an elongated piezoelectric element 20 which will be described with reference to FIGS. 1 and 2. One end of the element extends between the inlet 10 and the exhaust outlet 14 as will be described below, and the other end of the element extends into the housing recess 8. The other or second end of the element is embedded or encapsulated into a first support 22 which is formed of an insulating synthetic plastic material. The first support has a cylindrical configuration and extends laterally in the recess 8 as shown in FIG. 2. The first support is rotatable and longitudinally movable relative to the recess. However, the recess prevents lateral movement of the first support and thus the second end of the piezoelectric element.

A second support 24 is connected with the piezoelectric element 20 toward the first end thereof. The support 24 is also generally cylindrical and formed of synthetic plastic material. It encapsulates the side edges of the element which passes through the support as shown in FIG. 1. The second support 24 is rotatably connected with the housing 4 via projections 24a at opposite ends. This prevents longitudinal displacement of that portion of the element on which the support is mounted.

Sealing members 26 are mounted on opposite surfaces of the first end of the piezoelectric element 20, opposite the ends of the inlet 10 and the exhaust outlet 14 as shown in FIG. 1.

A signal source 28 is electrically connected with the piezoelectric element 20 via wires 30. The source is operable to deliver a signal or electric current to the piezoelectric element to place the element in an active condition. Preferably, the signal source comprises an AC or DC voltage source to energize the piezoelectric element.

As a base calculation for the voltage of the voltage source 28, it is known to provide 40V for each 0.001" thickness of one-half of the total thickness of the ceramic material of the piezoelectric element. For example, a common bimorph piezoelectric element includes two layers of piezo ceramic material, one layer on each side of a center element such as a brass shim. A thin layer of epoxy is used to mount the ceramic material on the center element. If the thickness of each layer of piezo ceramic material is 0.009", the required voltage is 360V, i.e. 40V×0.009". The total thickness of the ceramic material is 0.018", i.e. two layers each having a thickness of 0.009".

In. FIG. 1, the element 20 is shown in its inactive condition, i.e., no signal is being delivered to the element. The element thus has a planar configuration, with the first end closing the pressurized fluid inlet via the upper sealing member. No pressurized fluid is delivered to the equipment when the element is in the inactive state and any excess fluid in the equipment will be discharged through the exhaust.

Referring now to FIG. 3, the element 20 is shown in its active condition when a signal supplied thereto. The signal (or current) causes the piezoelectric element to shift or bend. The bending movement displaces the second end of the piezoelectric element within the recess toward the chamber and also causes a slight rotation of the first support member 22. Greater rotation occurs at the second support 24 and the first end portion of the element is forced downwardly against the exhaust outlet 14 to seal the outlet via the lower sealing member 26.

Preferably, the second support 24 is arranged approximately one-third of the distance from the first movable end of the piezoelectric element to the second end within the housing recess 8. With such an arrangement, the force applied to the exhaust outlet 14 is two to five times greater than that achieved by conventionally mounted piezoelectric elements using the same signal strength. The force is a function of the location of the second rotatable support relative to the element. This increased force prevents leakage of pressurized fluid through the exhaust, whereby the full pressure of the fluid is delivered to the power equipment via the working outlet 16, thereby maximizing the efficiency of the equipment.

When the signal is removed, the piezoelectric element returns to its inactive condition shown in FIG. 1. Of particular advantage is the fact that the piezoelectric element returns to its planar inactive condition in the event of a power outage to seal the pressurized inlet and allow excess pressure from the equipment to be released through the exhaust outlet 14 from the valve housing.

While the preferred forms and embodiments of the invention have been illustrated and described, it will be apparent to those of ordinary skill in the art that various changes and modifications may be made without deviating from the inventive concepts set forth above.

What is claimed is:

1. A valve, comprising
   (a) a housing containing a chamber, a pressurized fluid input, a working fluid outlet, and an exhaust outlet;
   (b) an elongated piezoelectric element arranged within said housing chamber and operable between an inactive condition in which one end portion of said element closes said pressurized fluid input and an active condition in which said element one end portion closes said exhaust outlet; and
   (c) means for mounting said piezoelectric element within said housing chamber, said mounting means including
      (1) a first support connected with a second end portion of said piezoelectric element and arranged in a recess in said housing; and
      (2) a second support connected with said piezoelectric element intermediate the ends thereof, said second support further being rotatably connected with said housing, whereby when said piezoelectric element is in said active condition, said element bends to apply a strong closing force of said first end portion against said exhaust outlet.

2. A valve as defined in claim 1, wherein said second support is connected with said piezoelectric element closer to said one end portion than said second end portion.

3. A valve as defined in claim 2, wherein said first and second supports are formed of an insulating material.

4. A valve as defined in claim 3, wherein said first and second supports are formed of synthetic plastic material.

5. A valve as defined in claim 4, wherein said first support encapsulates said second end portion of said piezoelectric element and said second support extends over edge portions of said piezoelectric element.

6. A valve as defined in claim 2, wherein said first support is rotatable and longitudinally displaced within said recess when said piezoelectric element switches between active and inactive conditions.

7. A valve as defined in claim 6, wherein said piezoelectric element includes sealing members on opposite surfaces thereof for closing said pressurized fluid input and said exhaust outlet, respectively.

8. A valve as defined in claim 7, wherein said sealing members are formed of synthetic plastic material.

* * * * *